United States Patent
Han et al.

(10) Patent No.: US 12,113,189 B2
(45) Date of Patent: Oct. 8, 2024

(54) BATTERY INCLUDING THERMALLY CONDUCTIVE FILLER MATERIAL WITH THERMAL RUNAWAY CONTAINMENT FUNCTION

(71) Applicant: GM GLOBAL TECHNOLOGY OPERATIONS LLC, Detroit, MI (US)

(72) Inventors: Su Jung Han, West Bloomfield, MI (US); David R. Clark, Grosse Pointe Woods, MI (US); Ryan P. Hickey, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 535 days.

(21) Appl. No.: 17/411,203

(22) Filed: Aug. 25, 2021

(65) Prior Publication Data
US 2023/0060247 A1 Mar. 2, 2023

(51) Int. Cl.
*H01M 10/653* (2014.01)
*H01M 10/658* (2014.01)
(Continued)

(52) U.S. Cl.
CPC ....... *H01M 10/653* (2015.04); *H01M 10/658* (2015.04); *H01M 50/176* (2021.01);
(Continued)

(58) Field of Classification Search
CPC . H01M 10/653; H01M 10/658; H01M 50/289
See application file for complete search history.

(56) References Cited

U.S. PATENT DOCUMENTS 10,079,412 B2  9/2018  Delobel et al.
10,615,470 B2 *  4/2020  Park .................. H01M 50/231
(Continued)

FOREIGN PATENT DOCUMENTS

CN  104854755 A  8/2015
CN  111613741 A * 9/2020 .......... H01M 10/613
(Continued)

OTHER PUBLICATIONS

Machine translation of DE102014221870 (no date) (Year: 0000).*
(Continued)

*Primary Examiner* — Amanda C. Walke
(74) *Attorney, Agent, or Firm* — Harness, Dickey & Pierce, P.L.C.

(57) ABSTRACT

A battery includes a battery cell stack disposed within a housing such that a gap exists between the battery cell stack and an inner surface of the housing. The battery cell stack includes a plurality of battery cells that each include a positive electrode tab and a negative electrode tab electrically coupled to an electrode assembly and extending from the electrode assembly outside of a case. The positive electrode tabs and/or the negative electrode tabs of the plurality of battery cells extend into the gap between the battery cell stack and the inner surface of the housing. A filler material fills the gap and provides a thermally conductive pathway between the positive electrode tabs and/or the negative electrode tabs of the plurality of battery cells and the inner surface of the housing. The filler material includes a thermally conductive particulate component distributed throughout a polymeric matrix component.

19 Claims, 2 Drawing Sheets

(51) Int. Cl.
*H01M 50/176* (2021.01)
*H01M 50/209* (2021.01)
*H01M 50/289* (2021.01)

(52) U.S. Cl.
CPC ....... *H01M 50/209* (2021.01); *H01M 50/289* (2021.01); *H01M 2200/10* (2013.01)

(56) References Cited

U.S. PATENT DOCUMENTS

| | | | |
|---|---|---|---|
| 10,992,000 B2 * | 4/2021 | Kim | H01M 50/227 |
| 11,749,849 B2 * | 9/2023 | Park | H01M 10/625 429/99 |
| 2020/0152932 A1 | 5/2020 | Ozawa et al. | |
| 2020/0377690 A1 * | 12/2020 | Ootsuki | H01M 50/105 |

FOREIGN PATENT DOCUMENTS

| | | | | |
|---|---|---|---|---|
| CN | 114410192 A | * | 4/2022 | |
| DE | 102014221870 A1 | | 4/2016 | |
| DE | 102021120781 A1 | | 2/2022 | |
| JP | 2012174972 A | | 9/2012 | |
| KR | 20070099066 A | * | 10/2007 | |
| WO | WO-2020204209 A1 | * | 10/2020 | ............. D21H 11/18 |
| WO | WO-2021100813 A1 | * | 5/2021 | .......... H01M 10/625 |
| WO | WO-2023170530 A1 | * | 9/2023 | |

OTHER PUBLICATIONS

Machine translation of WO 2012/044065 (no date) (Year: 0000).*
First Office Action for German Patent Application No. 10 2022 112 481.9 issued on Feb. 2, 2023, with correspondence from Manitz Finsterwald Patent—und Rechtsanwaltspartnerschaft mbB summarizing Office Action; 7 pages.
First Office Action for Chinese Patent Application No. 202210600080.9 issued on Mar. 14, 2024, with correspondence from China Patent Agent (H.K.) Ltd. summarizing Office Action; 8 pages.

* cited by examiner

BATTERY INCLUDING THERMALLY CONDUCTIVE FILLER MATERIAL WITH THERMAL RUNAWAY CONTAINMENT FUNCTION

INTRODUCTION

The present invention relates to thermal management of rechargeable batteries and, more particularly, to rechargeable batteries including thermally conductive filler materials with thermal runaway containment functionality.

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles. Electric vehicles, including hybrid electric vehicles, are powered by electric motors or generators that, in turn, are typically powered by onboard rechargeable batteries. Such batteries typically include multiple individual electrochemical cells (referred to herein as battery cells) arranged in series and/or parallel and positioned adjacent one another to form battery modules and/or battery packs that, when incorporated in a battery system of an electric vehicle, provide the vehicle with a combination of high voltage and high capacity.

Rechargeable batteries employed in electric vehicles internally generate heat under normal charging and discharge operations. To optimize the performance and life of such batteries, it is beneficial to implement cooling systems that can effectively transfer heat away from the battery cells during operation to maintain the temperature of the battery cells within a desirable operating temperature range. When a battery cell is subjected to certain abusive operating or charging conditions, or if a battery cell is manufactured with certain defects, the battery cell may generate a greater amount of heat than can be effectively removed from the battery cell by the cooling system, which may cause the battery cell to enter into a condition referred to as thermal runaway. During a thermal runaway event, the heat generated by the battery cell may be unbounded and may, in turn, cause adjacent battery cells to enter into thermal runaway, potentially initiating a cascading reaction that may spread through an entire battery system. In addition, battery cells undergoing thermal runaway may release hot effluent gases, sometimes near other components of the battery system, which may be negatively impacted by the temperature and/or composition of the effluent gases.

To prevent thermal runaway propagation between adjacent battery cells, thermal barriers may be positioned between groups of battery cells to contain the heat generated during a thermal runaway event to a small group of battery cells. To prevent accumulation of effluent gases, and to protect battery system components from exposure to such gases, battery housings may include a venting system configured to direct and control the flow of effluent gases through and out of the battery system.

SUMMARY

A battery comprises a housing and a battery cell stack disposed within an interior of the housing. The battery cell stack is disposed within the interior of the housing such that a gap exists between the battery cell stack and an inner surface of the housing. The battery cell stack includes a plurality of battery cells. Each of the plurality of battery cells includes a case, an electrode assembly sealed within the case, and a positive electrode tab and a negative electrode tab electrically coupled to the electrode assembly and extending from the electrode assembly outside the case. At least one of the positive electrode tab or the negative electrode tab extends into the gap between the battery cell stack and the inner surface of the housing. A filler material fills the gap and provides a thermally conductive pathway between the positive electrode tabs and/or the negative electrode tabs of the plurality of battery cells and the inner surface of the housing. The filler material includes a thermally conductive particulate component distributed throughout a polymeric matrix component.

The thermally conductive particulate component may comprise particles of at least one of alumina, silica, titania, zeolite, aluminum nitride, or silicon carbide.

The polymeric matrix component may comprise at least one of an organic polymer or a polysiloxane.

The polymeric matrix component may be configured to thermally decompose at temperatures greater than an upper operating temperature of the battery cells to form a thermal and physical barrier that inhibits heat transfer between the plurality of battery cells of the battery cell stack.

The polymeric matrix component may be configured to thermally decompose at temperatures greater than or equal to 200° C.

The polymeric matrix component may exhibit a thermal conductivity of less than 1 W/m·K, the thermally conductive particulate component may exhibit a thermal conductivity of greater than 50 W/m·K, and the filler material may exhibit a thermal conductivity in a range of from 3 W/m·K to 10 W/m·K.

The positive electrode tabs and the negative electrode tabs of the plurality of battery cells may extend into the gap between the battery cell stack and the inner surface of the housing, and the filler material may be in direct physical contact with the positive electrode tabs and the negative electrode tabs of the plurality of battery cells and with the inner surface of the housing.

The housing may be in thermal contact with a heatsink. In such case, the filler material may provide a thermally conductive pathway between the positive electrode tabs and the negative electrode tabs of the plurality of battery cells and the heatsink.

The battery may comprise a battery management system including at least one integrated circuit. In such case, the filler material may be disposed between the battery management system and the positive electrode tabs and/or the negative electrode tabs of the plurality of battery cells, and the polymeric matrix component of the filler material may be configured to thermally decompose at temperatures greater than an upper operating temperature of the battery cells to form a thermal and physical barrier that inhibits effluent gases released from the battery cells from coming into direct physical or thermal contact with the battery management system.

The filler material may be in direct physical contact with the battery management system and may provide a thermally conductive pathway between the at least one integrated circuit of the battery management system and the heatsink.

The positive electrode tabs of the plurality of battery cells may be electrically coupled to a first bus bar and the negative electrode tabs of the plurality of battery cells may be electrically coupled to a second bus bar. In such case, the first bus bar and the second bus bar may be in direct physical contact with the filler material, and the filler material may provide a thermally conductive pathway between the first bus bar, the second bus bar, and the heatsink.

The housing may include a top, a bottom, and a sidewall extending between the top and the bottom of the housing, and the top, the bottom, and the sidewall may at least partially define the interior of the housing. In such case, the battery cell stack may be disposed within the interior of the housing such that the gap extends between the battery cell stack and the sidewall of the housing, and the positive electrode tabs and/or the negative electrode tabs of the plurality of battery cells may extend into the gap and may be encased within the filler material.

The battery cell stack may be disposed within the interior of the housing such that a plenum is defined between an upper end of the battery cell stack and the top of the housing, and the filler material may fill the plenum.

The battery may be included in a vehicle.

A battery comprises a housing and a battery cell stack disposed within an interior of the housing. The battery cell stack is disposed within the interior of the housing such that a gap exists between the battery cell stack and an inner surface of the housing. The battery cell stack includes a first battery cell group including at least two adjacent battery cells and a second battery cell group including at least two adjacent battery cells. A partition physically separates the first battery cell group from the second battery cell group. Each of the battery cells of the first battery cell group and the second battery cell group includes an electrode assembly sealed within a case and a positive electrode tab and a negative electrode tab electrically coupled to the electrode assembly and extending from the electrode assembly outside the case. The positive electrode tabs and/or the negative electrode tabs of the battery cells extend into the gap between the battery cell stack and the inner surface of the housing. A filler material fills the gap and provides a thermally conductive pathway between the positive electrode tabs and/or the negative electrode tabs of the battery cells and the inner surface of the housing. The filler material includes a thermally conductive particulate component distributed throughout a polymeric matrix component.

The thermally conductive particulate material may comprise particles of at least one of alumina, silica, titania, zeolite, aluminum nitride, or silicon carbide. The polymeric matrix component may comprise at least one of an organic polymer or a polysiloxane.

The polymeric matrix component may be configured to thermally decompose at temperatures greater than an upper operating temperature of the battery cells to form a thermal and physical barrier that inhibits heat transfer between the first battery cell group and the second battery cell group via the gap.

The filler material may be in direct physical contact with the positive electrode tabs and/or the negative electrode tabs of the battery cells and with the inner surface of the housing.

The housing may be in thermal contact with a heatsink. In such case, the thermally conductive pathway provided by the filler material between the positive electrode tabs and/or the negative electrode tabs of the battery cells and the inner surface of the housing may promote conductive heat transfer between the positive electrode tabs and/or the negative electrode tabs of the battery cells and the heatsink.

The housing may include a top, a bottom, and a sidewall extending between the top and the bottom of the housing. The top, the bottom, and the sidewall may at least partially define the interior of the housing. The battery cell stack may be disposed within the interior of the housing such that the gap extends between the battery cell stack and the sidewall of the housing. The positive electrode tabs and/or the negative electrode tabs of the battery cells may extend into the gap between the battery cell stack and the sidewall of the housing. The polymeric matrix component may be configured to thermally decompose at temperatures greater than an upper operating temperature of the battery cells to form a thermal and physical barrier that inhibits heat transfer between the first battery cell group and the second battery cell group via the gap.

A plenum may be defined between an upper end of the battery cell stack and the top of the housing. The filler material may fill the plenum. The polymeric matrix component may be configured to thermally decompose at temperatures greater than an upper operating temperature of the battery cells to form a thermal and physical barrier that inhibits heat transfer between the first battery cell group and the second battery cell group via the plenum.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

Figure 1:
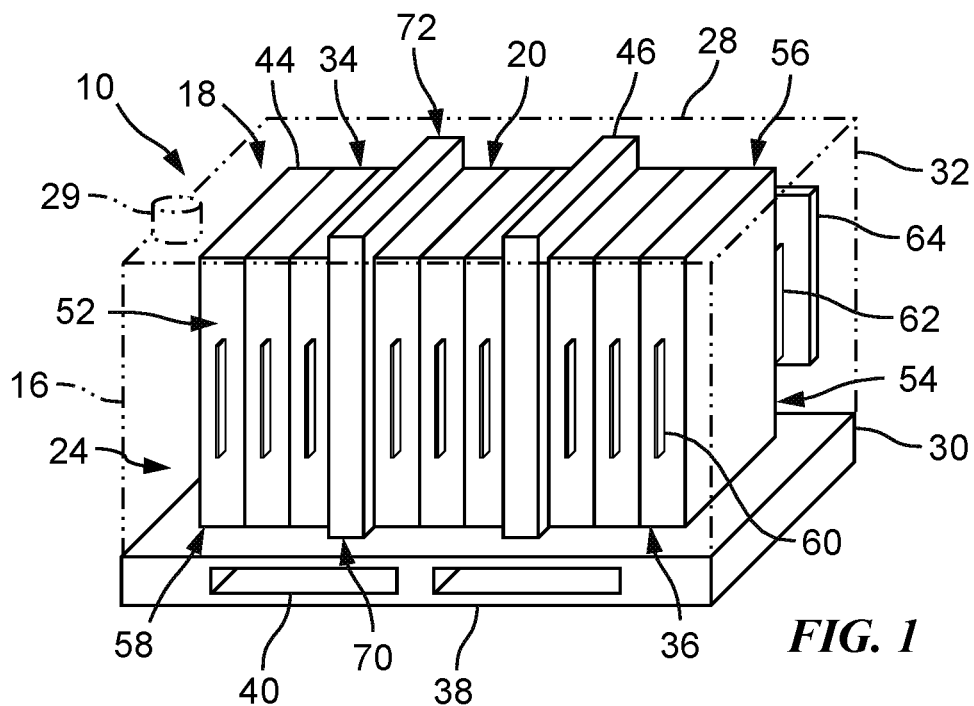
FIG. 1 is a schematic perspective view of a battery including a battery cell stack disposed within a housing, the battery cell stack including a plurality of battery cells and two partitions sandwiched between adjacent battery cells that divide the battery cells of the battery cell stack into first, second, and third groups of battery cells.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed filler material may be used in a housing of a battery to fill gaps or voids between a battery cell stack disposed within the housing and an inner surface of the housing itself. The filler material may be thermally conductive and may provide a thermally conductive pathway between battery cells of the battery cell stack and a heat sink associated with the battery. In aspects, the filler material may be formulated to thermally decompose when exposed to thermal runaway temperatures to form a thermal barrier that inhibits thermal runaway propagation through the battery cells of the battery cell stack.

In the following text, the term "battery" means a device that includes multiple interconnected electrochemical cells (battery cells) arranged in series and/or parallel and may refer to battery cells that are grouped together in the form of battery modules and/or battery packs. The term "about" means "within acceptable manufacturing tolerances" or "within 0-5% of."

Figure 2:
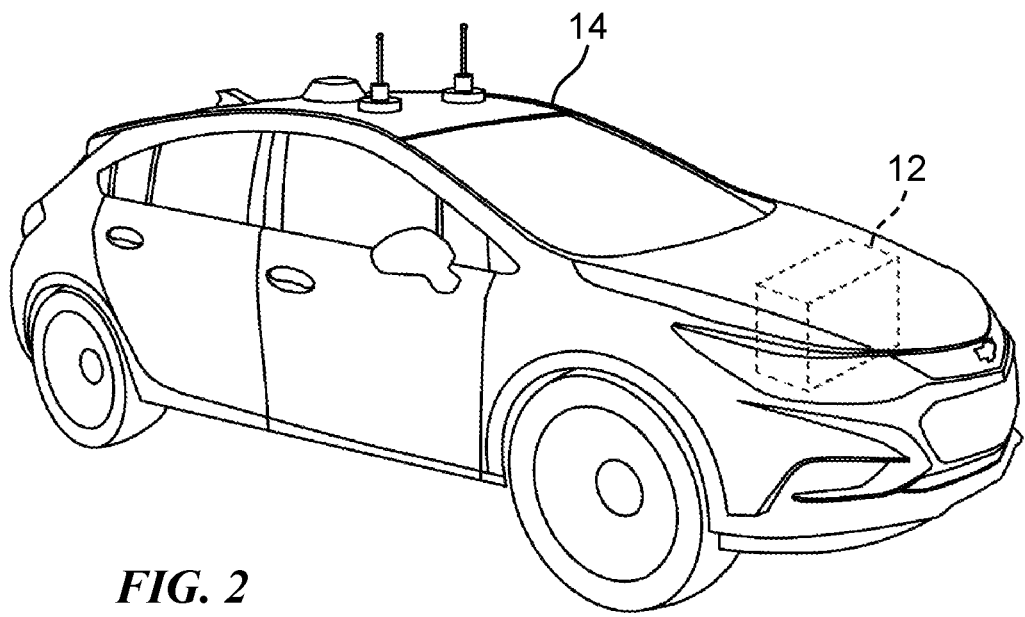
FIG. 2 is a schematic perspective view of an electric vehicle including the battery of FIG. 1.

FIG. 1 depicts a battery 10 that may be used in an electric power supply 12 of a vehicle 14, such as an electric vehicle (EV) or a hybrid electric vehicle (HEV), as shown in FIG. 2. The battery 10 includes a housing 16 that at least partially defines an interior 18, a battery cell stack 20 disposed within the interior 18 of the housing 16, and a filler material 22 (FIGS. 3 and 4) that fills a gap 24 between an inner surface 26 of the housing 16 and the battery cell stack 20.

The housing 16 is configured to support the battery cell stack 20 within the vehicle 14 and to protect the battery cell stack 20 from exposure to ambient environmental conditions. The housing 16 may include a top 28, a bottom 30, and at least one sidewall 32 extending between the top 28 and the bottom 30 of the housing 16. In aspects, a vent 29 may be in the top 28 of the housing 16 that facilitates pressure-induced venting of gas from the interior 18 of the housing 16. The housing 16 may be made of a thermally conductive material to allow heat to dissipate away from the battery cell stack 20 during operation. The housing 16 may be made of a metal, metal alloy, or a polymeric material having high thermal conductivity. For example, the housing 16 may be made of aluminum (Al) and/or copper (Cu). The housing 16 may be an assembly of multiple components or may be of unitary one-piece construction.

Figure 3:
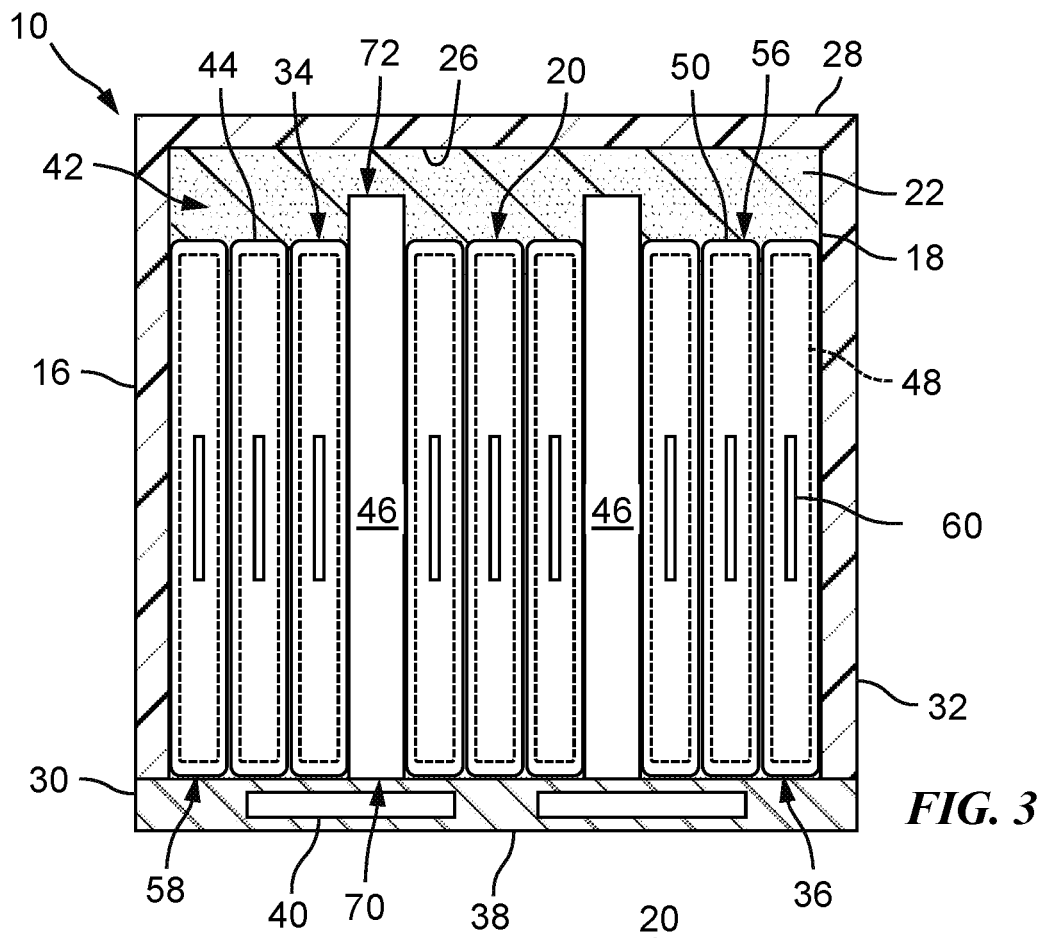
FIG. 3 is a schematic partial side-sectional view of the battery of FIG. 1 depicting the battery cell stack disposed within the housing and a filler material that fills a plenum defined between an upper end of the battery cell stack and a top of the housing.
Figure 4:
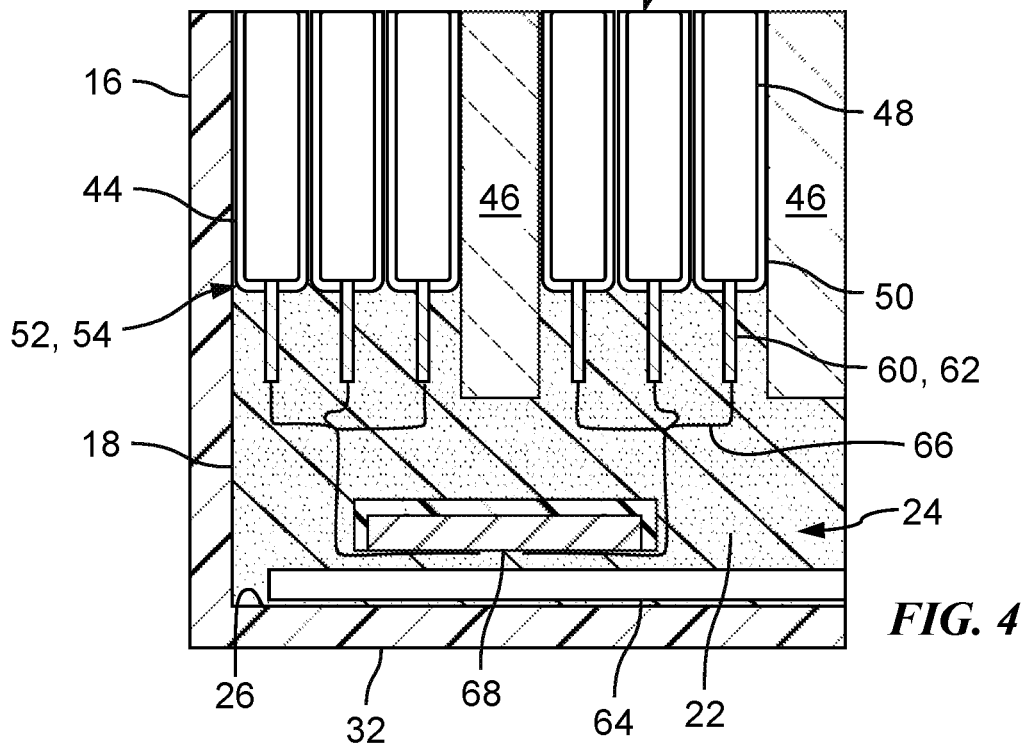
FIG. 4 is a schematic top-sectional view of the battery of FIG. 1 depicting the battery cell stack disposed within the housing and a filler material that fills a gap defined between the battery cells of the battery cell stack and a sidewall of the housing.

The battery cell stack 20 includes an upper end 34 adjacent the top 28 of the housing and a lower end 36 supported on and in thermal contact with the bottom 30 of the housing 16. The bottom 30 of the housing 16 may be in thermal contact with a heatsink 38 that transfers thermal energy (i.e., heat) away from the battery cell stack 20 to a heat transfer fluid (e.g., air or a liquid coolant) during operation of the battery 10. The heatsink 38 may include one or more passageways 40 that facilitate a continuous flow of the heat transfer fluid through the heatsink 38 during operation of the battery 10. In aspects, the heatsink 38 may be defined by the bottom 30 of the housing 16. The battery cell stack 20 is disposed within the interior 18 of the housing 16 such that the battery cell stack 20 is spaced-apart from at least one of the top 28 or the sidewall 32 of the housing 16. For example, as best shown in FIG. 4, the battery cell stack 20 may be disposed within the interior 18 of the housing 16 such that a gap 24 is defined between at least one sidewall 32 of the housing 16 and the battery cell stack 20. As best shown in FIG. 3, the battery cell stack 20 may be disposed within the interior 18 of the housing 16 such that a plenum 42 is defined between the top 28 of the housing 16 and the upper end 34 of the battery cell stack 20.

In FIGS. 1 and 3, the heatsink 38 is disposed adjacent to and in thermal contact with the bottom 30 of the housing 16; however, other arrangements are possible. For example, the heatsink 38 may be disposed adjacent to and in thermal contact with the top 28 and/or at least one sidewall 32 of the housing 16.

The battery cell stack 20 includes a plurality of battery cells 44 arranged side-by-side and optionally one or more partitions 46 that divide the battery cells 44 of the battery cell stack 20 into multiple groups of battery cells 44. In FIGS. 1, 3, and 4, the partitions 46 separate the battery cells 44 of the battery cell stack 20 into groups of three adjacent battery cells 44; however, the number of battery cells 44 in each group of battery cells 44 may be less than or greater than three. Each of the battery cells 44 in the battery cell stack 20 includes an electrode assembly 48 (including a separator sandwiched between a positive electrode and a negative electrode) infiltrated with an electrolyte (not shown) and sealed within a case 50 (FIGS. 3 and 4). The case 50 of each battery cell 44 defines opposite first and second ends 52, 54 (FIG. 1) and opposite upper and lower sides 56, 58 of the battery cell 44. A pair of electrically conductive positive and negative electrode tabs 60, 62 are electrically coupled to the electrode assembly 48 and extend from the electrode assembly 48 outside the case 50. In FIGS. 1, 3, and 4, the positive and negative electrode tabs 60, 62 respectively extend from the opposite first and second ends 52, 54 of the battery cells 44 into the gap 24 between the sidewall 32 of the housing 16 and the battery cell stack 20; however, other arrangements are possible. For example, in aspects, both the positive and negative electrode tabs 60, 62 may extend from the same end of the battery cells 44, i.e., from the first end 52 or the second end 54 of the battery cells 44. Alternatively, the positive and negative electrode tabs 60, 62 may extend from the upper sides 56 of the battery cells 44 into the plenum 42 between the top 28 of the housing 16 and the upper end 34 of the battery cell stack 20.

The battery cells 44 may be lithium-ion battery cells. For example, as shown in FIGS. 1, 3, and 4, the battery cells 44 may be pouch-type lithium-ion battery cells. In other aspects, the battery cells 44 may be prismatic or can-type lithium-ion battery cells.

The optional partitions 46 may be configured to help control the temperature of the battery cells 44 in the battery cell stack 20, may compensate for volumetric changes in the battery cells 44, and may inhibit thermal runaway propagation through the battery cells 44 of the battery cell stack 20. The partitions 46 may be sandwiched between adjacent groups of battery cells 44 in the battery cell stack 20 and may include a lower end 70 in thermal contact with the bottom 30 of the housing and an opposite upper end 72 that extends above the upper sides 56 of the battery cells 44 toward the top 28 of the housing 16. In aspects, the partitions 46 may exhibit a laminate structure, including one or more of a thermally conductive layer, a thermal insulation layer, and a compression layer (not shown). The thermally conductive layer may be in thermal contact with the heatsink 38 and may help transfer heat away from adjacent battery cells 44 during operation of the battery 10. The thermal insulation layer may help stop the spread of thermal runaway temperatures and/or combustion reactions through the partitions 46. The compression layer may help compensate for expansion, contraction, and other physical changes in shape that may be experienced by the battery cells 44 during operation of the battery 10 and may help maintain contact pressure between facing surfaces of the battery cells 44. The partitions 46 may be constructed and arranged within the battery cell stack 20 so that, if a thermal runaway event is initiated in a first group of battery cells 44 positioned on a first side of one of the partitions 46, the partition 46 may help prevent propagation of the thermal runaway event from the first group of battery cells 44 to a second neighboring group of battery cells 44 on an opposite second side of the partition 46.

In assembly, the battery cells 44 of the battery cell stack 20 may be electrically coupled to a battery management system (BMS) 64, which may include one or more integrated circuits (ICs) configured to measure certain operating parameters of the battery cells 44 (e.g., cell voltage and/or temperature), to control operation of the battery cells 44 (e.g., charging and discharging), and/or to couple the battery cells 44 to the electric power supply 12 of the vehicle 14 and/or to an external power source. As shown in FIGS. 1 and 4, in aspects, the battery management system 64 may be positioned within the interior 18 of the housing 16 in the gap 24 between the battery cell stack 20 and the sidewall 32 of the housing 16. Or the battery management system 64 may be positioned outside of the housing 16 and supported by the top 28 or the sidewall 32 of the housing 16. In aspects, a portion of the battery management system 64 may be located within the interior 18 of the housing 16 and another portion of the battery management system 64 may extend outside of the housing 16. The location of the battery management system 64 relative to the housing 16 may be selected based upon the orientation of the battery cells 44 within the housing 16 (and/or based upon the location of the positive and negative electrode tabs 60, 62 with respect to the top 28 and/or the sidewall 32 of the housing 16). As shown in FIG. 4, electrical connectors 66 may be used to respectively couple the positive and negative electrode tabs 60, 62 of the battery cells 44 to one another in a series or parallel arrangement, for example, via a bus bar 68.

The filler material 22 is configured to help transfer heat away from the battery cells 44 during normal operation of the battery 10 and, during a thermal runaway event, the filler material 22 is configured to prevent thermal runaway propagation through the battery cells 44 of the battery cell stack 20 and to mitigate damage to other components of the battery 10. To accomplish this, the filler material 22 may be made of a thermally conductive material that, when exposed to thermal runaway temperatures (e.g., temperatures greater than or equal to about 200° C.), thermally decomposes to form a thermal and physical barrier that inhibits propagation of the thermal runaway temperatures through the battery cells 44 of the battery cell stack 20 and through the surrounding components of the battery 10. For example, the filler material 22 may thermally decompose when exposed to thermal runaway temperatures to form a thermal and physical barrier that inhibits convective, conductive, and/or radiative heat transfer between the battery cells 44 of the battery cell stack 20 and/or between various components of the battery 10.

As shown in FIG. 3, in aspects, the filler material 22 may fill a region of the interior 18 of the housing 16 defined by the plenum 42 that extends between the top 28 of the housing 16 and the upper end 34 of the battery cell stack 20 (above the upper sides 56 of the battery cells 44 and above the upper ends 72 of the partitions 46). In such case, during normal operation of the battery 10, the filler material 22 may provide a thermally conductive pathway between adjacent battery cells 44 and the top 28 of the housing 16, which may help reduce thermal gradients between the battery cells 44 and help transfer heat away from the battery cells 44 via the top 28 of the housing 16. And, during a thermal runaway event, the filler material 22 may thermally decompose to form a thermal and physical barrier above the upper sides 56 of the battery cells 44 and above the upper ends 72 of the partitions 46 that prevents propagation of the thermal runaway temperatures between adjacent groups of battery cells 44 on opposite sides of the partitions 46.

As shown in FIG. 4, in aspects, the filler material 22 may fill a region of the interior 18 of the housing 16 defined by the gap 24 between the sidewall 32 of the housing 16 and the first and/or second ends 52, 54 of the battery cells 44. The filler material 22 may surround the positive and negative electrode tabs 60, 62 of the battery cells 44 such that the positive and negative electrode tabs 60, 62 (and the electrical connectors 66) are entirely encapsulated in the filler material 22. In addition, the filler material 22 may extend along the sidewall 32 of the housing 16 from the bottom 30 of the housing to or toward the top 28 of the housing 16. In this arrangement, during normal operation of the battery 10, the filler material 22 may provide a thermally conductive pathway between the positive and negative electrode tabs 60, 62 of the battery cells 44 and the bottom 30 of the housing 16 (and the heatsink 38), which may improve heat transfer away from the positive and negative electrode tabs 60, 62 and reduce thermal gradients within the battery cells 44 during operation of the battery 10. In aspects, the filler material 22 may surround and encapsulate the busbar 68, the battery management system 64, and/or other electrical components of the battery 10 disposed within the interior 18 of the housing 16 and electrically coupled to the positive and/or negative electrode tabs 60, 62 of the battery cells 44. In such case, the filler material 22 may provide a thermally conductive pathway between the busbar 68, the battery management system 64, and/or the other electrical components and the heatsink 38 associated with the housing 16.

During a thermal runaway event, the filler material 22 may thermally decompose to form a thermal and physical barrier between adjacent positive and/or negative electrode tabs 60, 62 of the battery cells 44 that prevents heat transfer between and around the tabs 60, 62. In addition, during a thermal runaway event, the filler material 22 may thermally decompose to form a thermal and physical barrier between the positive and/or negative electrode tabs 60, 62 and the battery management system 64 located in the gap 24 between the battery cell stack 20 and the sidewall 32 of the housing 16. Formation of a thermal and physical barrier between the positive and/or negative electrode tabs 60, 62 of the battery cells 44 and the battery management system 64 during a thermal runaway event may help prevent heat transfer from the positive and/or negative electrode tabs 60, 62 to the battery management system 64 and also may help direct effluent gases generated by the battery cells 44 toward the vent 29 in the top 28 of the housing 16 (instead of allowing the gases to vent through the battery management system 64 and/or through the sidewall 32 of the housing 16).

The filler material 22 exhibits a composite structure that includes a thermally conductive particulate component distributed throughout a polymeric matrix component. The polymeric matrix component may include a continuous monolithic three-dimensional network in which the particulate component is embedded or dispersed. The term "monolithic" refers to a three-dimensional structure that is not particulate in nature. The particulate component provides the filler material 22 with high thermal conductivity during normal operation of the battery 10, and the matrix component allows the filler material 22 to infiltrate the gap 24 and/or the plenum 42 in the housing 16 and provides the filler material 22 with the ability to thermally decompose or char when exposed to thermal runaway temperatures to form a thermal and physical barrier that helps contain the thermal runaway event. The "thermal runaway temperatures" that may initiate thermal decomposition of the matrix component of the filler material 22 may include temperatures that are greater than an upper operating temperature limit of the battery cells 44 of the battery 10, e.g., temperatures of greater than or equal to about 200° C. The thermal runaway temperatures that may initiate thermal decomposition of the matrix component of the filler material 22 may be significantly lower than the temperatures which may be reached within the battery 10 during a thermal runaway event, e.g., temperatures of greater than 900° C.

The polymeric matrix component may be porous, solid, or gelatinous and may comprise or consist essentially of a polymer, e.g., an organic polymer having a covalently-bonded carbon backbone and/or an inorganic silicone polymer (polysiloxane) having a silicon-oxygen backbone. Example polymers include: epoxy resin, phenolic resin, polyester, polyurethane, urea-formaldehyde resin, polyethylene, polyethylene-vinyl acetate, polypropylene, polystyrene, polyvinylchloride, polychloroprene, polyimide, polyamide, polylactic acid, poly (methyl methacrylate), silicone, natural rubber, ethylene-propylene diene monomer (EPDM) rubber, styrene butadiene rubber, and/or nitrile rubber. In aspects where the polymeric matrix component is porous, the polymeric matrix component may exhibit a porosity in a range of from about 16% to about 50%.

The polymeric matrix component may exhibit a thermal conductivity of less than about 1 W/m·K. For example, the polymeric matrix component may exhibit a thermal conductivity in a range of from about 0.1 W/m·K to about 0.5 W/m·K.

The thermally conductive particulate component may provide the filler material 22 with a thermal conductivity of about 3 W/m·K. In aspects, the thermally conductive particulate component may provide the filler material 22 with a thermal conductivity in a range of from about 3 W/m·K to about 10 W/m·K.

The thermally conductive particulate component may account for, by volume, less than 50% of the filler material 22. For example, the thermally conductive particulate component may account for, by volume, greater than 5%, 10%, or 20% of the filler material 22, less than 50%, 40%, or 30% of the filler material 22, or between 5-50%, 10-40%, or 20-30% of the filler material 22.

The thermally conductive particulate component may be made of a ceramic-based material and may include particles of alumina, silica, titania, zeolite, aluminum nitride, silicon carbide, aluminum oxide, aluminum nitride, boron nitride, silicon nitride, and/or beryllium oxide.

The thermally conductive particulate component may be made up of particles having a mean particle diameter in a range of from 0.2 micrometers to 100 micrometers.

The filler material 22 may be introduced into the interior 18 of the housing 16 after full or partial assembly of the battery 10. The filler material 22 may be introduced into the interior 18 of the housing 16, for example, by preparing a mixture including a liquid polymer precursor and particles of the thermally conductive particulate component. Gas may be generated within the liquid polymer precursor using a mechanical, physical, and/or chemical foaming technique, and then allowing the polymer precursor to stabilize and solidify.

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A battery comprising:
a housing having an inner surface that at least partially defines an interior of the housing;
a battery cell stack disposed within the interior of the housing such that a gap exists between the battery cell stack and the inner surface of the housing, the battery cell stack including a plurality of battery cells that each include:
a case;
an electrode assembly sealed within the case; and
a positive electrode tab and a negative electrode tab electrically coupled to the electrode assembly and extending from the electrode assembly outside the case,
wherein at least one of the positive electrode tab or the negative electrode tab extends into the gap between the battery cell stack and the inner surface of the housing; and
a filler material that fills the gap and provides a thermally conductive pathway between the positive electrode tabs and/or the negative electrode tabs of the plurality of battery cells and the inner surface of the housing,
wherein the filler material includes a thermally conductive particulate component distributed throughout a polymeric matrix component,
wherein the thermally conductive particulate component accounts for, by volume, greater than 5% and less than 50% of the filler material, and
wherein the polymeric matrix component is configured to thermally decompose at temperatures greater than an upper operating temperature of the battery cells to form a thermal and physical barrier that inhibits heat transfer between the plurality of battery cells of the battery cell stack.

2. The battery of claim 1 wherein the thermally conductive particulate component comprises particles of at least one of alumina, silica, titania, zeolite, aluminum nitride, or silicon carbide.

3. The battery of claim 2 wherein the polymeric matrix component comprises at least one of an organic polymer or a polysiloxane.

4. The battery of claim 2 wherein the polymeric matrix component comprises at least one organic polymer selected from the group consisting of phenolic resin, polyester, urea-formaldehyde resin, polyethylene, polyethylene-vinyl acetate, polypropylene, polystyrene, polyvinylchloride, polychloroprene, polyimide, polyamide, polylactic acid, poly (methyl methacrylate), natural rubber, ethylene-propylene diene monomer (EPDM) rubber, styrene butadiene rubber, and nitrile rubber.

5. The battery of claim 1 wherein the polymeric matrix component is configured to thermally decompose at temperatures greater than or equal to 200° C.

6. The battery of claim 1 wherein the polymeric matrix component exhibits a thermal conductivity of less than 1 W/m·K, the thermally conductive particulate component exhibits a thermal conductivity of greater than 50 W/m·K, and the filler material exhibits a thermal conductivity in a range of from 3 W/m·K to 10 W/m·K.

7. The battery of claim 1 wherein the positive electrode tabs and the negative electrode tabs of the plurality of battery cells extend into the gap between the battery cell stack and the inner surface of the housing, wherein the filler material is in direct physical contact with the positive electrode tabs and the negative electrode tabs of the plurality of battery cells and with the inner surface of the housing, wherein the housing is in thermal contact with a heatsink, and wherein the filler material provides a thermally conductive pathway between the positive electrode tabs and the negative electrode tabs of the plurality of battery cells and the heatsink.

8. The battery of claim 7 further comprising:
a battery management system including at least one integrated circuit, the battery management system being disposed within the interior of the housing in the gap between the battery cell stack and the inner surface of the housing,
wherein the filler material extends between the battery management system and the positive electrode tabs and/or the negative electrode tabs of the plurality of battery cells, and
wherein the polymeric matrix component of the filler material is configured to thermally decompose at temperatures greater than an upper operating temperature of the battery cells to form a thermal and physical barrier that inhibits effluent gases released from the battery cells from being directed toward or coming into thermal contact with the battery management system.

9. The battery of claim 8 wherein the filler material is in direct physical contact with the battery management system, and wherein the filler material provides a thermally conductive pathway between the at least one integrated circuit of the battery management system and the heatsink.

10. The battery of claim 7 wherein the positive electrode tabs of the plurality of battery cells are electrically coupled to a first busbar and the negative electrode tabs of the plurality of battery cells are electrically coupled to a second busbar, wherein the first busbar and the second busbar are in direct physical contact with the filler material, and wherein the filler material provides a thermally conductive pathway between the first busbar, the second busbar, and the heatsink.

11. The battery module of claim 1 wherein the housing includes a top, a bottom, and a sidewall extending between the top and the bottom of the housing, wherein the top, the bottom, and the sidewall at least partially define the interior of the housing, wherein the battery cell stack is disposed within the interior of the housing such that the gap extends between the battery cell stack and the sidewall of the housing, wherein the positive electrode tabs and/or the negative electrode tabs of the plurality of battery cells extend into the gap and are encased within the filler material, wherein the battery cell stack is disposed within the interior of the housing such that a plenum is defined between an upper end of the battery cell stack and the top of the housing, and wherein the filler material at least partially fills the plenum and extends between the top of the housing and the upper end of the battery cell stack.

12. The battery of claim 11, further comprising:
a vent in the top of the housing configured to facilitate pressure-induced venting of gas from the interior of the housing,
wherein the polymeric matrix component is configured to thermally decompose at temperatures greater than an upper operating temperature of the battery cells to form a thermal and physical barrier between the battery cell stack and the sidewall of the housing such that effluent gases generated by the battery cells are directed toward the vent in the top of the housing and not through the sidewall of the housing.

13. The battery of claim 1 wherein the polymeric matrix component has a porosity of from 16% to 50%.

14. The battery of claim 1 wherein the thermally conductive particulate component comprises particles of at least one of silica, titania, zeolite, or a combination thereof.

15. A battery comprising:
a housing having an inner surface that at least partially defines an interior of the housing;
a battery cell stack disposed within the interior of the housing such that a gap exists between the battery cell stack and the inner surface of the housing, the battery cell stack including:
a first battery cell group including at least two adjacent battery cells;
a second battery cell group including at least two adjacent battery cells; and
a partition that physically separates the first battery cell group from the second battery cell group,
wherein each of the battery cells of the first battery cell group and the second battery cell group includes an electrode assembly sealed within a case and a positive electrode tab and a negative electrode tab electrically coupled to the electrode assembly and extending from the electrode assembly outside the case, and
wherein the positive electrode tabs and/or the negative electrode tabs of the battery cells extend into the gap between the battery cell stack and the inner surface of the housing; and
a filler material that fills the gap and provides a thermally conductive pathway between the positive electrode tabs and/or the negative electrode tabs of the battery cells and the inner surface of the housing,
wherein the filler material includes a thermally conductive particulate component distributed throughout a polymeric matrix component,
wherein the thermally conductive particulate component accounts for, by volume, greater than 5% and less than 50% of the filler material, and
wherein the polymeric matrix component is configured to thermally decompose at temperatures greater than an upper operating temperature of the battery cells to form a thermal and physical barrier that inhibits heat transfer between the first battery cell group and the second battery cell group via the gap.

16. The battery of claim 15 wherein the thermally conductive particulate material comprises particles of at least one of alumina, silica, titania, zeolite, aluminum nitride, or silicon carbide, and wherein the polymeric matrix component comprises at least one of an organic polymer or a polysiloxane.

17. The battery of claim 15 wherein the filler material is in direct physical contact with the positive electrode tabs and/or the negative electrode tabs of the battery cells and with the inner surface of the housing, wherein the housing is in thermal contact with a heatsink, and wherein the thermally conductive pathway provided by the filler material between the positive electrode tabs and/or the negative electrode tabs of the battery cells and the inner surface of the housing promotes conductive heat transfer between the positive electrode tabs and/or the negative electrode tabs of the battery cells and the heatsink.

18. The battery of claim 15 wherein:
the housing includes a top, a bottom, and a sidewall extending between the top and the bottom of the housing;
the top, the bottom, and the sidewall at least partially define the interior of the housing;

the battery cell stack is disposed within the interior of the housing such that the gap extends between the battery cell stack and the sidewall of the housing;

the positive electrode tabs and/or the negative electrode tabs of the battery cells extend into the gap between the battery cell stack and the sidewall of the housing;

a plenum is defined between an upper end of the battery cell stack and the top of the housing;

the partition extends between the first battery cell group and the second battery cell group and has a lower end in contact with the bottom of the housing and an opposite upper end that extends above the upper end of the battery cell stack toward the top of the housing;

the partition forms a thermal and physical barrier between the first battery cell group and the second battery cell group that inhibits heat transfer between the first battery cell group and the second battery cell group;

the filler material fills the plenum and extends between the top of the housing and the upper end of the battery cell stack and between top of the housing and the upper end of the partition; and the polymeric matrix component is configured to thermally decompose at temperatures greater than an upper operating temperature of the battery cells to form a thermal and physical barrier that inhibits heat transfer between the first battery cell group and the second battery cell group via the plenum.

19. The battery of claim 18 wherein:

the bottom of the housing is in thermal contact with a heatsink;

the partition has a laminate structure comprising a thermally conductive layer, a thermal insulation layer, and a compression layer;

the thermally conductive layer is in thermal contact with the heatsink; and the compression layer is configured to compensate for expansion and contraction of the battery cells and to maintain contact pressure between facing surfaces of the battery cells.

\* \* \* \* \*